United States Patent [19]
Janssen et al.

[11] 3,818,017
[45] June 18, 1974

[54] 1-[1-(2-HYDROXY-3-ARYLOXYPROPYL)-4-PIPERIDYL]-2-BENZIMIDAZOLINONES AND RELATED COMPOUNDS

[75] Inventors: Paul Adriaan Jan Janssen, Vosselaar; van Ineke Wijngaarden, Beerse; Willem Soudijn, Turnhout, all of Belgium

[73] Assignee: Janssen Pharmaceutica, N.V., Beerse, Belgium

[22] Filed: Jan. 4, 1973

[21] Appl. No.: 321,059

[52] U.S. Cl.... 260/293.6, 260/294.8 R, 260/295 K, 260/295 S, 424/266, 424/267
[51] Int. Cl. .................... C07d 29/30, C07d 31/44
[58] Field of Search ..................... 260/293.6, 295 K

[56] References Cited
UNITED STATES PATENTS

| | | | |
|---|---|---|---|
| 3,161,645 | 12/1964 | Janssen | 260/293.6 |
| 3,225,052 | 12/1965 | Janssen | 260/293.6 |
| 3,345,364 | 10/1967 | Janssen | 260/240 |

*Primary Examiner*—Alan L. Rotman
*Attorney, Agent, or Firm*—Salvatore R. Conte

[57] ABSTRACT

Compounds of the class of 1-[1-(2-hydroxy-3-aryloxypropyl)-4-piperidyl]- and 1-[1,2,3,6-tetrahydro-1-(2-hydroxy-3-aryloxypropyl)-4-pyridyl]-2-benzimidazolinones, useful as antihypertensive agents.

18 Claims, No Drawings

1-[1-(2-HYDROXY-3-ARYLOXYPROPYL)-4-PIPERIDYL]-2-BENZIMIDAZOLINONES AND RELATED COMPOUNDS

SUMMARY OF THE INVENTION:

An object of this invention is to provide a new class of 2-benzimidazolinone derivatives, in particular, those denoted as 1-[1-(2-hydroxy-3-aryloxypropyl)-4-piperidyl]- and 1-[1,2,3,6-tetrahydro-1-(2-hydroxy-3-aryloxypropyl)-4-pyridyl] -2-benzimidazolinones, which compounds demonstrate marked blood pressure lowering activity. The subject compounds differ structurally from those of the prior art by the 2-hydroxy-3-aryloxypropyl substituent on the nitrogen atom of the respective piperidyl and pyridyl moieties. The prior art may be represented by the following references: U.S. Pat. Nos. 3,345,364; 3,318,900; 3,225,052; and 3,161,645.

DESCRIPTION OF THE PREFERRED EMBODIMENTS:

The novel 2-benzimidazolinone derivatives of this invention may be structurally represented by the following formula:

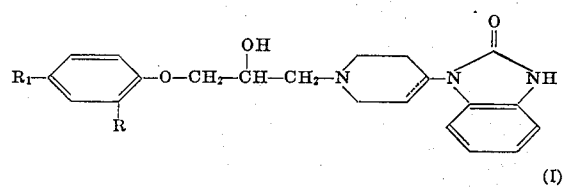

(I)

and the therapeutically active acid addition salts thereof, wherein R is a member selected from the group consisting of hydrogen, halo, cyano, loweralkoxy, phenoxy, lower-alkanoyl, loweralkenyloxy, loweralkynyloxy and loweralkoxy-carbonyl; $R_1$ is a member selected from the group consisting of hydrogen, halo and loweralkenyl; and the dotted line indicates that a double bond between the 3 and 4 carbon atoms of the piperidine nucleus is optional.

As used herein, the terms "loweralkoxy" and "loweralkanoyl" indicate a 1 to 5 carbon atom content, straight or branch chained; the terms "loweralkenyl" and "loweralkynyl" indicate unsaturated hydrocarbons having from 3 to 5 carbon atoms wherein the unsaturation occurs at the beta-, gamma- or delta-carbon atoms, preferably allyl and propargyl (2-propynyl), respectively; and the term "halo" refers to halogens of atomic weight less than 127, i.e., fluoro, chloro, bromo and iodo. With regard to $R_1$, hydrogen is preferred; when $R_1$ is halo, then R is preferably hydrogen; and when $R_1$ is loweralkenyl, then R is preferably loweralkoxy.

The subject compounds (I) are conveniently prepared by reacting an appropriate epoxy ether of the formula:

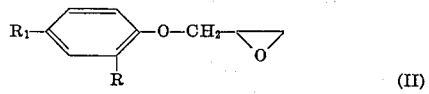

(II)

wherein R and $R_1$ are as previously described, with an appropriate 2-benzimidazolinone derivative (see U.S. Pat. No. 3,161,645) of the formula:

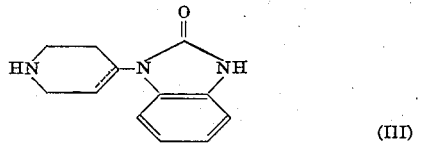

(III)

wherein the dotted line indicates an optional double bond. The reaction is carried out, preferably under reflux conditions, in a suitable solvent such as, for example, an aromatic hydrocarbon, e.g., benzene, toluene, xylene and the like, a lower alkanol, a lower alkanone, or, preferably, a mixture of benzene and methanol (approximately 5:1). The desired product (I) is recoverable by conventional means.

It is obvious from formula (I) that the carbon atom to which the hydroxy group is attached is asymmetric and, consequently, the resolution and isolation of the corresponding (+) and (−) forms of stereochemical optical isomers (enantiomorphs) can be accomplished by application of general principles known in the art. Said pharmacologically active enantiomorphs are naturally intended to be included within the scope of this invention.

The formula (I) bases are convertible to therapeutically active non-toxic acid addition salts by treatment with an appropriate acid, such as, for example, an inorganic acid, such as a hydrohalic acid, e.g., hydrochloric, hydrobomic and the like, and sulfonic acid, nitric acid, phosphoric acid and the like; or an organic acid, such as, for example, acetic, propionic, glycolic, lactic, pyruvic, malonic, succinic, maleic, fumaric, malic, tartaric, citric, benzoic, cinnamic, mandelic, methanesulfonic, ethanesulfonic, benzenesulfonic, p-toluenesulfonic, cyclohexanesulfamic, salicylic, p-aminosalicylic and the like acids. Conversely, the salt form can be converted by treatment with alkali into the free base form.

The starting materials of formulas (II) and (III) are for the most part known and may be obtained from methodologies available to one skilled in the art. For example, the epoxy ethers of formula (II) are readily prepared by the condensation of an appropriate 2-R-4-$R_1$-phenol of formula (IV) with 3-chloro-1,2-epoxypropane (V) in sodium methoxide-methanol.

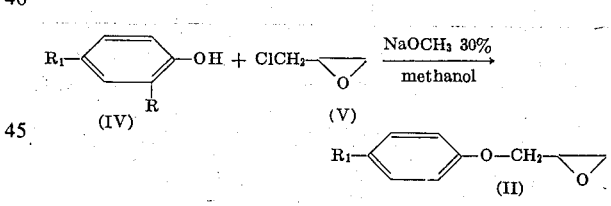

The nomenclature employed for the subject compounds (I) is based upon the presence or absence of the double bond indicated by the dotted line in the piperidine nucleus. Without the double bond, the formula (I) compounds are denoted as 1-[1-(2-hydroxy-3-aryloxypropyl)-4-piperidyl]-2-benzimidazolinones; and with the double bond, as 1-[1,2,3,6-tetrahydro-1-(2-hydroxy-3-aryloxypropyl)-4-pyridyl]-2-benzimidazolinones.

The compounds of formula (I), in base or acid addition salt form, have been found to possess marked blood pressure lowering activity making them useful as antihypertensive agents. When administered in doses of about 0.8–5.0 mg/kg to anesthetized dogs (30 mg/kg i.p. sodium pentobarbital) a decrease in arterial blood pressure of at least 20 mm/Hg is observed.

The following examples are intended to illustrate, but not to limit, the scope of the present invention. Unless otherwise stated, all parts are by weight.

EXAMPLE I

To a stirred solution of 0.54 parts of 1-(4-piperidyl)-2-benzimidazolinone in 2.4 parts of benzene and 0.45 parts of methanol are added 0.44 parts of 1,2-epoxy-3-phenoxypropane and the whole is further stirred at reflux temperature for 1hr.30min. The reaction mixture is diluted with petroleumether, whereupon the product is separated as an oil. The solvent is decanted and the oily residue is washed twice with petroleumether and then dissolved in 2-propanol. The solution is filtered and the product is crystallized from the filtrate. It is filtered off and boiled twice in methanol, yielding 1-[1-(2-hydroxy-3-phenoxypropyl)-4-piperidyl]-2-benzimidazolinone; mp. 183.2°C.

EXAMPLE II

A. To a stirred solution of 1.09 parts of 1-(4-piperidyl)-2-benzimidazolinone, 5 parts of benzene and 0.8 parts of methanol are added 1.05 parts of 1,2-epoxy-3-(o-acetylphenoxy)-propane and the whole is further stirred at reflux temperature for 1hr.30min. The reaction mixture is diluted with petroleumether and while stirring the product is separated as an oil. The petroleumether is decanted and the oily product is triturated in fresh petroleumether. The crystalline product is filtered off and recrystallized from a mixture of 2-propanol and methanol, yielding 1-{ 1-[3-(o-acetylphenoxy)-2-hydroxypropyl]-4-piperidyl{-2-benzimidazolinone; mp. 178°–179°C.

B. By repeating the procedure of Example II-A, except that an equivalent quantity of 1,2-epoxy-3-(o-propionylphenoxy)-propane is substituted for the 1,2-epoxy-3-(o-acetylphenoxy)-propane used therein, the following product is obtained: 1-{ 1-[2-hydroxy-3-(o-propionylphenoxy)propyl]-4-piperidyl}-2-benzimidazolinone.

EXAMPLE III

To a stirred solution of 1.08 parts of 1-(4-piperidyl)-2-benzimidazolinone in 5 parts of benzene and 0.8 parts of methanol are added 1.19 parts of 1,2-epoxy-3-(o-methoxyphenoxy)propane. The whole is stirred and refluxed for 1hr.30min. The reaction mixture is cooled and diluted with petroleumether, whereupon the product is crystallized. It is filtered off, washed once more with petroleumether and recrystallized from warm absolute ethanol. The product is filtered off and dried, yielding 1-{ 1-[2-hydroxy-3-)o-methoxyphenoxy)propyl]-4-piperidyl}-2-benzimidazolinone; mp. 154.4°C.

EXAMPLE IV

A mixture of 1.2 parts of 1,2,-epoxy-3-(o-allyloxyphenoxy)propane, 1.09 parts of 1-(4-piperidyl)-2-benzimidazolinone. 5 parts of benzene and 0.8 parts of methanol is stirred and refluxed for 30 minutes. The reaction mixture is diluted with petroleumether, whereupon an oily product of 1-{ 1-[3-(oallyloxyphenoxy)-2-hydroxypropyl]-4-piperidyl}-2-benzimidazolinone is separated. The latter is washed with fresh petroleum-ether and dissolved in a mixture of benzene and ether. To this solution is added a saturated solution of oxalic acid dihydrate in ether. The precipitated oxalate salt is filtered off and crystallized from acetone, yielding 1-{ 1-[3-(o-allyloxyphenoxy)-2-hydroxypropyl]-4-piperidyl}-2-benzimidazolinone hemioxalate; mp. 145°–146.5°C.

EXAMPLE V

A mixture of 1.2 parts of 1,2,-epoxy-3-(o-propynyloxy-phenoxy)propane, 1.09 parts of 1-(4-piperidyl)-2-benzimidazolinone, 5 parts of benzene and 1 part of methanol is stirred and refluxed for 1hr.30min. The reaction mixture is cooled and upon dilution with petroleumether, an oily product of 1-[1-{ 2-hydroxy-3-[o-(2-propynyloxy)phenoxy]propyl }-4-piperidyl]-2-benzimidazolinone is separated. The latter is washed with fresh petroleumether and dissolved in a mixture of acetone and ether. To this solution is added an equivalent amount of oxalic acid dihydrate in ether. The crystallized salt is filtered off, washed with ether and dried, yielding 1-[1-{ 2-hydroxy-3-[o-(2-propynyloxy)phenoxy]propyl }-4-piperidyl]-2-benzimidazolinone oxalate; mp. 196°–204°C.

EXAMPLE VI

A mixture of 1.4 parts of 1,2,-epoxy-3-(o-phenoxyphenoxy)propane, 1.08 parts of 1-(4-piperidyl)-2-benzimidazolinone, 5 parts of benzene and 1 part of methanol is stirred and refluxed for 1hr.30min. The reaction mixture is cooled and upon dilution with petroleumether, an oily product of 1-{ 1-[2-hydroxy-3-(o-phenoxyphenoxy)propyl]-4-piperidyl}-2-benzimidazolinone is separated. The latter is washed with fresh petroleumether, taken up in acetone and acidified with an equivalent quantity of oxalic acid dihydrate in acetone. The crystallized salt is filtered off and dried, yielding 1-{ 1-[2-hydroxy-3-(o-phenoxyphenoxy)propyl]-4-piperidyl}-2-benzimidazolinone oxalate; mp. 163.5°C.

EXAMPLE VII

A mixture of 1.1 parts of 1,2-epoxy-3-(4-allyl-2-methoxyphenoxy)propane, 0.95 parts of 1-(4-piperidyl-2-benzimidazolinone, 4.5 parts of benzene and 0.8 parts of methanol is stirred and refluxed for 1hr.30min. The reaction mixture is cooled and upon dilution with petroleumether, the product is separated as an oil. The latter is converted into the oxalate salt in petroleumether and acetone. The salt is filtered off and crystallized from acetone, yielding 1-{ 1-[3-(4-allyl-2-methoxyphenoxy)-2-hydroxypropyl]-4-piperidyl}-2-benzimidazolinone oxalate; mp. 194°–198.5°C.

EXAMPLE VIII

A. A mixture of 4.2 parts of 1,2,-epoxy-3-(o-ethoxyphenoxy)-propane, 4.7 parts of 1-(4-piperidyl)-2-benzimidazolinone, 40 parts of benzene and 4 parts of methanol is stirred and refluxed for 5 hours. The reaction mixture is evaporated and the residue is converted into the oxalate salt in acetone, yielding 1-{ 1-[3-(o-ethoxyphenoxy)-2-hydroxypropyl]-4-piperidyl} -2-benzimidazolinone oxalate; mp.153.6°C.

B. The procedure of Example VIII-A is repeated, except that an equivalent amount of 1-(2,3-epoxypropoxy)-2-isopropoxybenzene is substituted for the 1,2,-epoxy-3-)o-ethoxyphenoxy)propane used therein, to yield as the final product: 1-

{ 1-[2-hydroxy-3-(o-isopropoxyphenoxy)propyl]-4-piperidyl}-2-benzimidazolinone oxalate.

EXAMPLE IX

A mixture of 1.71 parts of 1,2-epoxy-3-(p-chlorophenoxy)propane, 1.09 parts of 1-(4-piperidyl)-2-benzimidazolinone, 5 parts of benzene and 0.8 parts of methanol is stirred and refluxed for 1hr.30min. The reaction mixture is cooled and diluted with petroleumether, whereupon an oil is separated. The oil is washed with petroleumether and taken up in boiling 2-propanol. Hyflo is added to the hot solution and shaken for a few minutes. The hyflo is filtered off and the product is allowed to crystallize while cooling. It is filtered off, washed with 2-propanol and dried in vacuo at 60°C, yielding 1-{ 1-[3-(p-chlorophenoxy)-2-hydroxypropyl]-4-piperidyl}-2-benzimidazolinone; mp. 164.1°C.

EXAMPLE X

A. A mixture of 1.71 parts of 1,2-epoxy-3-(o-chlorophenoxy)propane, 1.09 parts of 1-(4-piperidyl)-2-benzimidazolinone, 5 parts of benzene and 0.8 parts of methanol is stirred and refluxed for 1hr.30min. The reaction mixture is cooled and upon the addition of petroleumether, the product is crystallized. It is filtered off and recrystallized from 2-propanol, yielding 1-{ 1-[3-(o-chlorophenoxy)-2-hydroxypropyl]-4-piperidyl}-2-benzimidazolinone; mp. 176.3°C.

B. The procedure of Example X-A is repeated, except that an equivalent amount of 1-bromo-2-(2,3-epoxypropoxy)benzene is substituted for the 1,2-epoxy-3-(o-chlorophenoxy)propane used therein, to yield as the final product: 1-{ 1-[3-(o-bromophenoxy)-2-hydroxypropyl]-4-piperidyl}-2-benzimidazolinone.

EXAMPLE XI

A mixture of 4.9 parts of butoxy-2-(2,3-epoxypropoxy)benzene, 4.35 parts of 1-(4-piperidyl)-2-benzimidazolinone, 80 parts of benzene and 4 parts of methanol is stirred and refluxed overnight. The reaction mixture is evaporated and the residue is converted into the oxalate salt in acetone, yielding 4 parts of 1-{ 1-[3-(o-butoxyphenoxy)-2-hydroxypropyl]-4-piperidyl}-2-benzimidazolinone oxalate; mp. 154.8°C.

EXAMPLE XII

A mixture of 1.05 parts of o-(2,3-epoxypropoxy)-benzonitrile, 1.09 parts of 1-(4-piperidyl)-2-benzimidazolinone, 5 parts of benzene and 0.8 parts of methanol is stirred and refluxed for 1hr.30min. The reaction mixture is cooled and diluted with petroleumether. The precipitated product is filtered off and purified by column-chromatography, using a mixture of chloroform and 1% of methanol. The pure fractions are collected and the solvent is evaporated. The residue is converted into the oxalate salt in acetone, yielding 1-{ 1-[3-(o-cyanophenoxy)-2-hydroxypropyl]-4-piperidyl}-2-benzimidazolinone oxalate hemihydrate; mp. 160.4°C. (dec.).

EXAMPLE XIII

A mixture of 1.27 parts of 2'-(2,3-epoxypropoxy)-butyrophenone, 1.09 parts of 1-(4-piperidyl)-2-benzimidazolinone, 5 parts of benzene and 0.8 parts of methanol is stirred and refluxed for 1hr.30min. The reaction mixture is cooled and upon the addition of petroleumether, the product is separated as an oil. The latter is washed with fresh petroleumether and purified by column-chromatography, using a mixture of chloroform and 1 percent of methanol. The pure fractions are collected and the solvent is evaporated. The residue is converted into the cyclohexane-sulfamate salt in acetone. The salt is filtered off, washed with acetone and dried, yielding 1-{ 1-[3-(o-butyrylphenoxy)-2-hydroxypropyl]-4-piperidyl } -2-benzimidazolinone cyclohexanesulfamate; mp. 101.5°C.

EXAMPLE XIV

A mixture of 1.7 parts of methyl o-(2,3-epoxypropoxy)-benzoate, 1.5 parts of 1-(4-piperidyl)-2-benzimidazolinone, 6.5 parts of benzene and 1.2 parts of methanol is stirred and refluxed for 1hr.30min. The reaction mixture is cooled and upon dilution with petroleumether, the product is crystallized. It is filtered off, washed with fresh petroleumether and crystallized from 2-propanol, yielding methyl o-{ 2-hydroxy-3-[4-(2-oxo-1-benzimidazolinyl)piperidino]propoxy}benzoate isopropyl alcoholate; mp. 102.3°C.

EXAMPLE XV

A mixture of 0.85 parts of 1,2-epoxy-3-phenoxypropane, 1.08 parts of 1-(1,2,3,6-tetrahydro-4-pyridyl)-2-benzimidazolinone, 5 parts of benzene and 1.2 parts of methanol is stirred and refluxed for 2 hours. The reaction mixture is cooled, filtered over hyflo and the filtrate is diluted with petroleumether, whereupon the product is separated as an oil. The latter is washed with fresh petroleumether and crystallized from 2-propanol, yielding 1-[1,2,3,6-tetrahydro-1-(2-hydroxy-3-phenoxypropyl)-4-pyridyl]-2-benzimidazolinone; mp. 162.5°C.

EXAMPLE XVI

A mixture of 1.16 parts of 1,2-epoxy-3-(o-acetylphenoxy)propane, 1.08 parts of 1-(1,2,3,6-tetrahydro-4-pyridyl)-2-benzimidazolinone, 5 parts of benzene and 1.2 parts of methanol is stirred and refluxed for 2 hours. The reaction mixture is cooled and filtered over hyflo. The filtrate is diluted with petroleumether, whereupon the product is separated as an oil. The latter is washed with fresh petroleumether and crystallized from 2-propanol, yeilding 1-{ 1-[3-(o-acetylphenoxy)-2-hydroxypropyl]-1,2,3,6-tetrahydro-4-pyridyl } -2-benzimidazolinone; mp. 144.3°C.

EXAMPLE XVII

A mixture of 1.19 parts of 1,2,-epoxy-3-)o-methoxyphenoxy)propane, 1.08 parts of 1-(1,2,3,6-tetrahydro-4-pyridyl)-2-benzimidazolinone, 5 parts of benzene and 1.2 parts of methanol is stirred and refluxed for 2 hours. The reaction mixture is cooled, filtered over hyflo and the filtrate is diluted with petroleumether. The solvent is decanted and the oily residue is washed with fresh petroleumether. After crystallization of the crude fraction from acetone, and drying at 60°C in vacuo, 1-{ 1,2,3,6-tetrahydro-1-[2-hydroxy-3-(o- methoxyphenoxy)propyl]-4-pyridyl} -2-benzimidazolinone is obtained; mp. 94°–100°C.

EXAMPLE XVIII

By repeating each of the procedures described in Examples IV through XIV, except that an equivalent amount of 1-(1,2,3,6-tetrahydro-4-pyridyl)-2-benzimidazoline is substituted for the 1-(4-piperidyl)-2-benzimidazolinone used in each of said examples, the corresponding 1-[1,2,3,6-tetrahydro-1-(2-hydroxy-3-aryloxypropyl)-4-pyridyl]-2-benzimidazolinones of formula (I) are obtained as respective products.

EXAMPLE XIX

A. To a stirred mixture of 221 parts of o-isopropoxyphenol and 490 parts of 3-chloro-1,2-epoxypropane are added dropwise 240 parts of sodium methoxide solution 30 percent and 200 parts of methanol at room temperature. Upon completion, stirring is continued for one hour. The reaction mixture is evaporated and the residue is distilled twice, yielding 1-(2,3-epoxypropoxy)-2-isopropoxybenzene, bp. 95°–110°C at 0.4 mm. pressure.

B. The methodology of Example XIX-A illustrates a procedure for making the epoxy ethers of formula (II). For example, by repeating said procedure, except that an equivalent amount of an appropriate phenol of formula (IV) is substituted for the o-isopropoxyphenol used therein, the following respective products are obtained:

1-n-butoxy-2-(2,3-epoxypropoxy)benzene, bp. 120°C at 0.4 mm.;
1,2-epoxy-3-(o-propionylphenoxy)propane; and
1-bromo-2-(2,3-epoxypropoxy)benzene.

We claim:

1. A chemical compound selected from the group consisting of a benzimidazoline derivative having the formula:

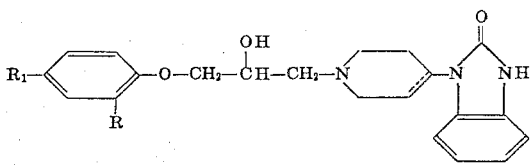

and the therapeutically active acid addition salts thereof, wherein R is a member selected from the group consisting of hydrogen, halo, loweralkoxy, phenoxy, loweralkanoyl, loweralkenyloxy and loweralkynyloxy; $R_1$ is a member selected from the group consisting of hydrogen, halo and loweralkenyl; and the dotted line represents an optional bond.

2. A chemical compound selected from the group consisting of a benzimidazoline derivative having the formula:

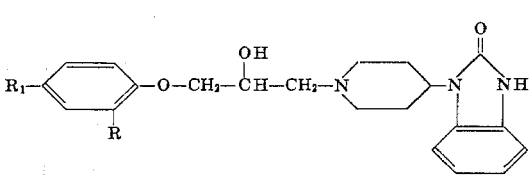

and the therapeutically active acid addition salts thereof, wherein R is a member selected from the group consisting of hydrogen, halo, loweralkoxy, phenoxy, loweralkanoyl, loweralkenyloxy and loweralkynyloxy; $R_1$ is a member selected from the group consisting of hydrogen, halo and loweralkenyl.

3. A chemical compound selected from the group consisting of a benzimidazoline derivative having the formula:

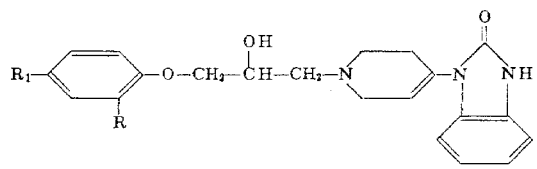

and the therapeutically active acid addition salts thereof, wherein R is a member selected from the group consisting of hydrogen, halo, loweralkoxy, phenoxy, loweralkanoyl, loweralkenyloxy and loweralkynyloxy; $R_1$ is a member selected from the group consisting of hydrogen, halo and loweralkenyl.

4. A compound selected from the group consisting of 1-[1-(2-hydroxy-3-phenoxypropyl)-4-piperidyl]-2-benzimidazolinone and the therapeutically active acid addition salts thereof.

5. A compound selected from the group consisting of 1-{ 1-[3-(o-acetylphenoxy)-2-hydroxypropyl]-4-piperidyl 2-benzimidazolinone }-2-benzimidazolinone the therapeutically active acid addition salts thereof.

6. A compound selected from the group consisting of 1-{ 1-[2-hydroxy-3-(o-methoxyphenoxy)propyl]-4-piperidyl}-2-benzimidazolinone and the therapeutically active acid addition salts thereof.

7. A compound selected from the group consisting of 1-{ 1-[3-(o-allyloxyphenoxy)-2-hydroxypropyl]-4-piperidyl}-2-benzimidazolinone and the therapeutically active acid addition salts thereof.

8. A compound selected from the group consisting of 1-[ 1-{2-hydroxy-3-[o-(2-propynyloxy)phenoxy]propyl} -4-piperidyl]-2-benzimidazolinone and the therapeutically active acid addition salts thereof.

9. A compound selected from the group consisting of 1-{ 1-[2-hydroxy-3-(o-phenoxyphenoxy)propyl]-4-piperidyl}-2-benzimidazolinone and the therapeutically active acid addition salts thereof.

10. A compound selected from the group consisting of 1-{ 1-[3-(4-allyl-2-methoxyphenoxy)-2-hydroxypropyl]-4-piperidyl}-2-benzimidazolinone and the therapeutically active acid addition salts thereof.

11. A compound selected from the group consisting of 1-{ 1-[3-(o-ethoxyphenoxy)-2-hydroxypropyl]-4-piperidyl}-2-benzimidazolinone and the therapeutically active acid addition salts thereof.

12. A compound selected from the group consisting of 1-{ 1-[3-(p-chlorophenoxy)-2-hydroxypropyl]-4-piperidyl}-2-benzimidazolinone and the therapeutically active acid addition salts thereof.

13. A compound selected from the group consisting of 1-{ 1-[3-(o-chlorophenoxy)-2-hydroxypropyl]-4-piperidyl}-2-benzimidazolinone and the therapeutically active acid addition salts thereof.

14. A compound selected from the group consisting of 1-{ 1-[3-(o-butoxyphenoxy)-2-hydroxypropyl]-4-piperidyl}-2-benzimidazolinone and the therapeutically active acid addition salts thereof.

15. A compound selected from the group consisting of 1-{ 1-[3-(o-butyrylphenoxy)-2-hydroxypropyl]-4-piperidyl}-2-benzimidazolinone and the therapeutically active acid addition salts thereof.

16. A compound selected from the group consisting of 1-[1,2,3,6-tetrahydro-1-(2-hydroxy-3-phenoxypropyl)-4-pyridyl]-2-benzimidazolinone and the therapeutically active acid addition salts thereof.

17. A compound selected from the group consisting of 1-{ 1-[3-(o-acetylphenoxy)-2-hydroxypropyl]-1,2,3,6-tetrahydro-4-pyridyl }-2-benzimidazolinone and the therapeutically active acid addition salts thereof.

18. A compound selected from the group consisting of 1-{ 1,2,3,6-tetrahydro-1-[2-hydroxy-3-(o-methoxyphenoxy)-propyl]-4-pyridyl }-2-benzimidazolinone and the therapeutically active acid addition salts thereof.

* * * * *

PC-1050
(5/69)

UNITED STATES PATENT OFFICE
CERTIFICATE OF CORRECTION

Patent No. 3,818,017      Dated June 18, 1974

Inventor(s) Paul Adriaan Jan Janssen, Ineke van Wijngaarden, Willem Soudijn

It is certified that error appears in the above-identified patent and that said Letters Patent are hereby corrected as shown below:

In Column 3, line 30, "{-2-benzimidazolinone" should read --- }-2-benzimidazolinone ---.

In Column 3, line 61, "(oallyloxyphenoxy)" should read ---(o-allyloxyphenoxy)---.

In Column 4, line 33, "acidfied" should read --- acidified ---.

In Column 6, line 51, "yeilding" should read --- yielding ---.

Signed and sealed this 10th day of December 1974.

(SEAL)
Attest:

McCOY M. GIBSON JR.
Attesting Officer

C. MARSHALL DANN
Commissioner of Patents

Notice of Adverse Decision in Interference

In Interference No. 99,216, involving Patent No. 3,818,017, P. A. J. Janssen, I. V. Wijngaarden and W. Soudijn, 1-[1-(2-HYDROXY-3-ARYLOXY-PROPYL) - 4 - PIPERIDYL] - 2 - BENZIMIDAZOLINONES AND RELATED COMPOUNDS, final judgment adverse to the patentees was rendered Apr. 20, 1977, as to claims 2 and 12.

[*Official Gazette August 2, 1977.*]